United States Patent
Lai et al.

(10) Patent No.: US 6,996,585 B2
(45) Date of Patent: Feb. 7, 2006

(54) METHOD FOR VERSION RECORDING AND TRACKING

(75) Inventors: Mu-Hsuan Lai, Hsinchu (TW); Ying-Wei Hsu, Hsinchu (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 462 days.

(21) Appl. No.: 10/252,405

(22) Filed: Sep. 24, 2002

(65) Prior Publication Data

US 2003/0182320 A1 Sep. 25, 2003

(30) Foreign Application Priority Data

Mar. 22, 2002 (TW) ..................................... 91105557 A

(51) Int. Cl.
*G06F 17/30* (2006.01)

(52) U.S. Cl. ..................................... 707/203

(58) Field of Classification Search .................. 707/203; 714/100
See application file for complete search history.

(56) References Cited

U.S. PATENT DOCUMENTS

| | | | | | |
|---|---|---|---|---|---|
| 5,359,659 | A | * | 10/1994 | Rosenthal | 713/200 |
| 5,371,885 | A | * | 12/1994 | Letwin | 707/205 |
| 5,608,865 | A | * | 3/1997 | Midgely et al. | 714/1 |
| 5,778,395 | A | * | 7/1998 | Whiting et al. | 707/204 |
| 6,078,968 | A | * | 6/2000 | Lo et al. | 710/5 |
| 6,286,013 | B1 | * | 9/2001 | Reynolds et al. | 707/200 |
| 2003/0018892 | A1 | * | 1/2003 | Tello | 713/164 |

OTHER PUBLICATIONS

The C–128 CP/M Disk System, Herne Data Systems, Ltd., Sep. 10, 1996, available at web site znode51.de/specials/manuals/juggler/cpm5.txt.*

* cited by examiner

*Primary Examiner*—Wayne Amsbury
(74) *Attorney, Agent, or Firm*—Birch, Stewart, Kolasch & Birch, LLP

(57) ABSTRACT

A method for version recording and tracking. First, a file is stored into a data directory. Thereafter, the checksum of the file is calculated. Then, the version information, the filename, the size, and the checksum of the file are stored into the data directory. When a file needs to track its version information, the checksum of the file is calculated. Then, a data directory is searched to obtain the version information according to the checksum, the filename, and the size of the file.

7 Claims, 5 Drawing Sheets

| Path | Filename | Setup date | Size | Type | Check sum | Version information |
|---|---|---|---|---|---|---|
| \3.7\SP1\patch 0926\tbcs gui\ | tbcs.exe | 2001/3/1 | 753664 | File | 162-218-472 | 3.7 SP1 patch 0926 |

FIG. 2

METHOD FOR VERSION RECORDING AND TRACKING

BACKGROUND OF THE INVENTION

1. Field of the Invention

The present invention relates to a method for version recording and tracking, and particularly to a checksum-based method for version recording and tracking with integration of file attributes.

2. Description of the Related Art

For in-house development applications, it is important for IT (Information Technology) resources to control the release versions of online applications. Since several versions may exist for one application, the engineers of the IT department have to know what the exact versions of current running applications are and their release history. If the version of one online application is not correct, the operation can stop and thereby jeopardize the consistency and security of system data.

Most conventional version tracking methods check version information of a file according to the source code of the file. For example, choosing the "About" option in the window system or entering the "perl-v" command in the command system will display the version information of the file.

Since the current method is source code dependent and in-house applications originate in different departments, it is hard to define a general rule to control and track version information. Further, there is no uniform strategy for different file types, such as documents and INI files.

SUMMARY OF THE INVENTION

It is therefore an object of the present invention to provide a checksum-based method for version recording and tracking with integration of file attributes that can be applied to all file types, such as execution files and documents.

To achieve the above object, a method for version recording according to one embodiment of the present invention is provided. First, a file is stored into a data directory. Thereafter, the checksum of the file is calculated. Then, the version information, the filename, and the size of the file are stored into the data directory. Finally, the checksum of the file is stored into the data directory.

The file attributes, such as the setup date and the file type, are further stored into the data directory. Furthermore, the status of the file is monitored. If the file is updated as a new file, the checksum of the new file is calculated, and the checksum, the filename, and the size of the new file are stored into the data directory.

Further, a method for version tracking according to another embodiment of the present invention is also provided. First, the checksum of a file is calculated. Then, a data directory is searched according to the checksum, the filename, and the size of the file. Finally, the version information corresponding to the checksum, the filename, and the size of the file in the data directory is output.

In addition, the checksum of an online file is calculated. The data directory is searched according to the checksum, the filename, and the size of the online file, a warning message is output if the checksum of the online file is different from the checksum recorded in the data directory corresponding to the filename and the size of the online file.

According to the embodiments of the present invention, the method to calculate the checksum of a file is to divide the content of the file into a plurality of regions. Thereafter, the corresponding contents in these regions are calculated with XOR (exclusive or) operation, thus obtaining a sample region. Then, the sample contents with a predetermined offset in the sample region are summed into several sub-checksum values. Finally, these sub-checksum values are combined to obtain the checksum of the file.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The aforementioned objects, features, and advantages of this invention will become apparent by referring to the following detailed description of the preferred embodiment with reference to the accompanying drawings, which are given by way of illustration only, and thus are not limitative of the present invention, and wherein:

FIG. 2 illustrates the data record of a file in the data directory;

DETAILED DESCRIPTION OF THE INVENTION

Figure 1:
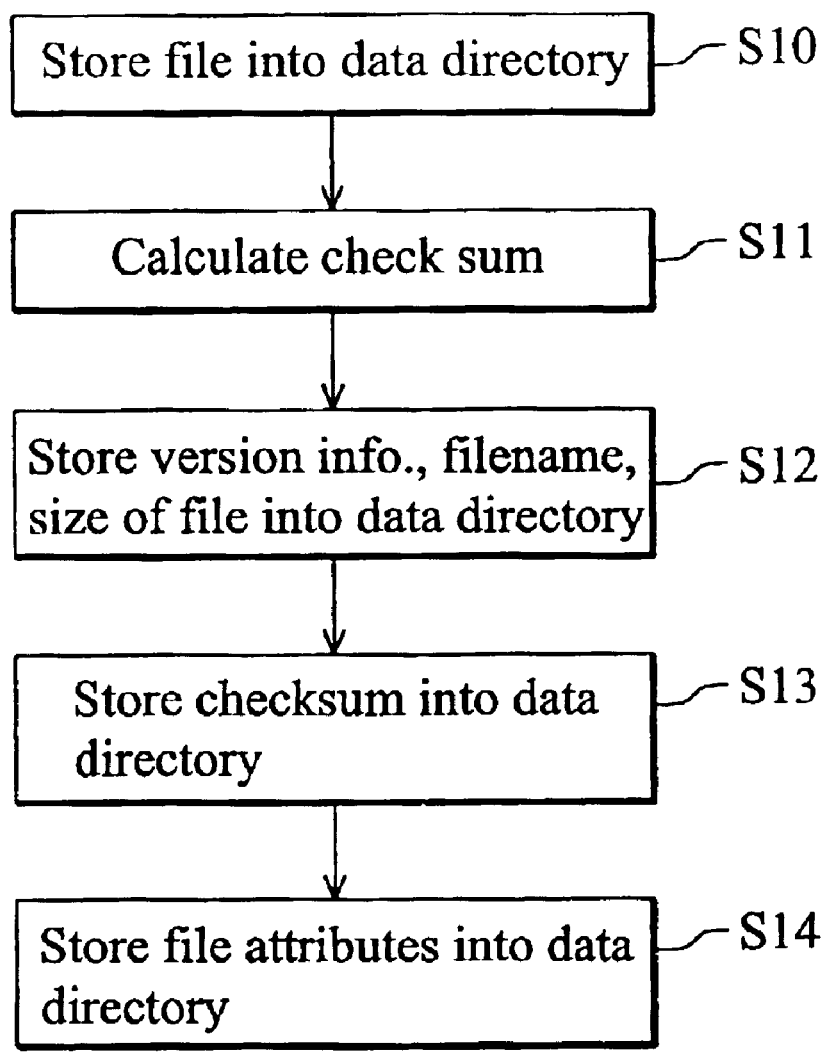
FIG. 1 is a flowchart illustrating the operation of the method for version recording according to the embodiment of the present invention.

FIG. 1 is a flowchart illustrating the operation of the method for version recording according to the embodiment of the present invention.

First, in step S10, a file to be released is stored into a data directory. Note that different files may store into different data directories, and the copies of a file with different versions may store into different sub-directories under the same data directory. The name of the data directory and the name of the sub-directory may determine according to the filename and version information of the file respectively. It should be noted that the file according to the present invention applies to all file types, such as execution files and documents.

Thereafter, in step S11, the checksum of the file is calculated. The method for calculating the checksum will be discussed later. Then, in step S12, the version information, the filename, and the size of the file are recorded as the data record and the data record is stored into the data directory.

Finally, in step S13 and S14, the checksum of the file and the file attributes, such as the setup date and the file type of the file are recorded into the data record in the data directory.

Furthermore, the status of the file can be monitored. If the file is updated as a new file, the checksum of the new file is calculated, and the checksum, the filename, and the size of the new file are stored into the data directory. The checksum and data record of the file is calculated again if the file is updated.

FIG. 2 illustrates the data record 20 of a file "tbcs.exe" in the data directory. The data record 20 includes the storage path, filename, setup date, size, file type, checksum, and version information of the file "tbcs.exe". Note that the version information may be assigned by users or automatically extracted according to the directory structure, such as the name of main directory and the name of sub-directory.

Figure 3:
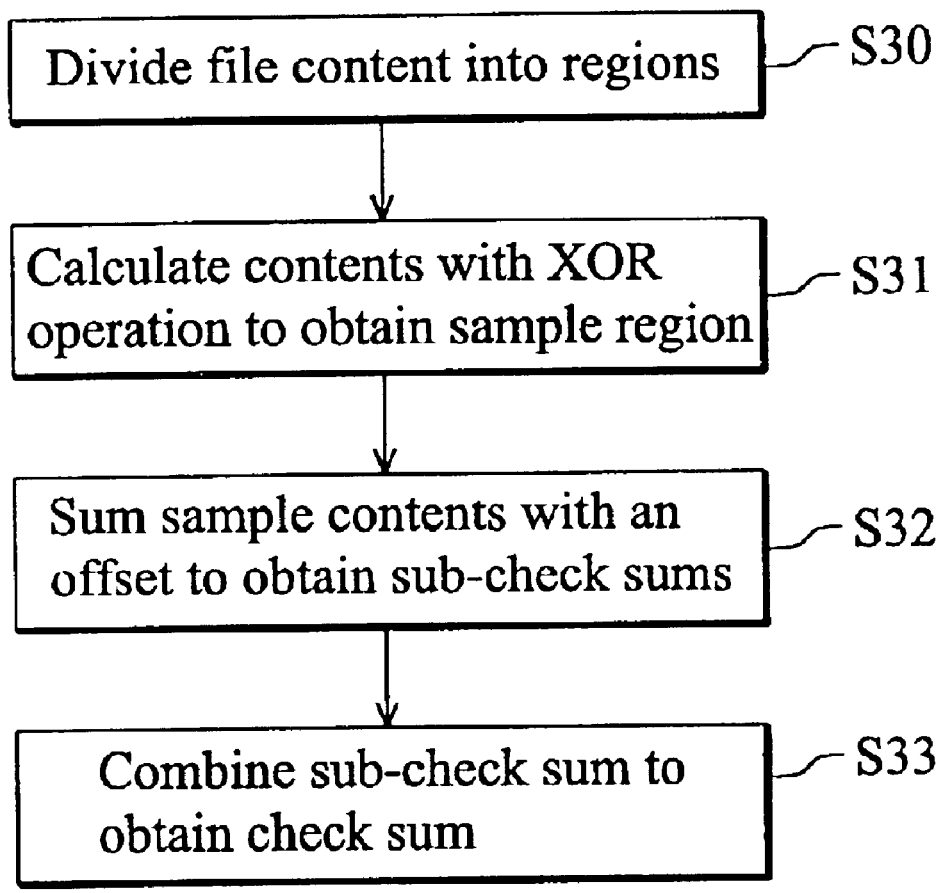
FIG. 3 is a flowchart illustrating the operation of the method to calculate the checksum according to the embodiment of the present invention.

FIG. 3 is a flowchart illustrating the operation of the method to calculate the checksum according to the embodiment of the present invention.

First, in step S30, the content of a file is divided into a plurality of regions. Thereafter, in step S31, the corresponding contents in these regions are calculated with XOR (exclusive or) operation, thus obtaining a sample region. Then, in step S32, the sample contents with a predetermined offset in the sample region are summed into several sub-checksum values. Finally, in step S33, these sub-checksum values are combined to obtain the checksum of the file.

It should be noted that the objective of the method for calculating checksum according to the embodiment of the present invention is to improve the efficiency of conventional checksum calculation method and reduce the load of system. However, the conventional method may be also employed if system load is not a consideration.

Figure 4:
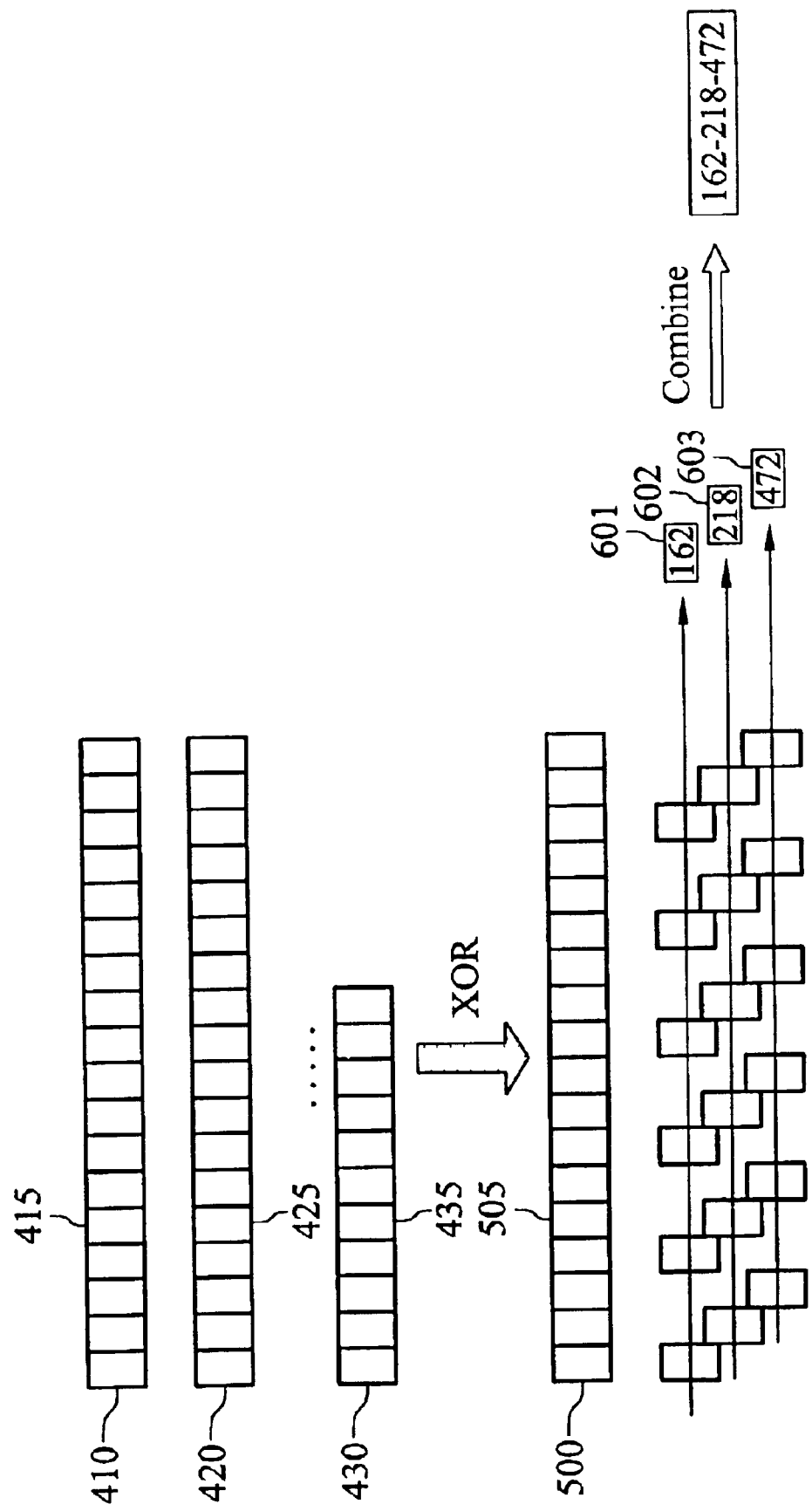
FIG. 4 is a schematic diagram illustrating the process of calculating the checksum of a file.

FIG. 4 is a schematic diagram illustrating the process of calculating the checksum of a file. First, the content of the file is divided into several regions 410, 420, . . . , 430. The corresponding contents in these regions are calculated by XOR, thus a sample region 500 is obtained. For example, the contents 415, 425, . . . , and 435 are calculated by XOR.

Then, the sample contents with offset 3 (the predetermined offset) in the sample region are summed into three sub-checksum values 162, 218 and 472 (block 601, 602, and 603) respectively. Finally, these sub-checksum values are combined to obtain the checksum "162-218-472" (block 700).

Figure 5:
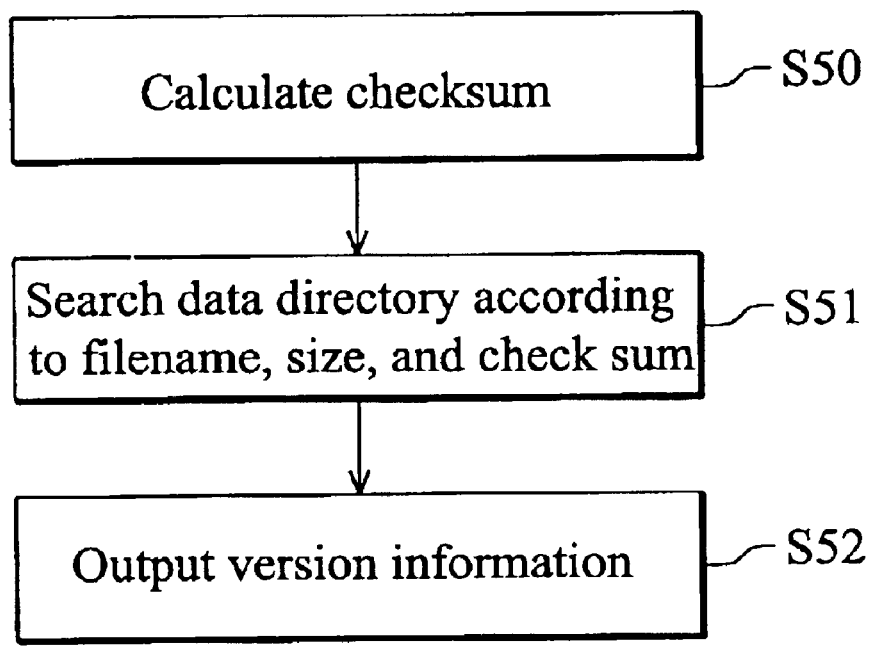
FIG. 5 is a flowchart illustrating the operation of the method for version tracking according to the embodiment of the present invention.

FIG. 5 is a flowchart illustrating the operation of the method for version tracking according to the embodiment of the present invention.

First, in step S50, the checksum of the file is calculated. Then, in step S51, a data directory is searched according to the checksum, the filename, and the size of the file. Finally, in step S52, the version information corresponding to the checksum, the filename, and the size of the file in the data directory is output.

When an online file needs to track its version information, the checksum of the online file is calculated in real time. The data directory is searched according to the checksum, the filename, and the size of the online file. If the checksum of the online file is different from the checksum recorded in the data directory corresponding to the filename and the size of the online file, a warning message is output. Once the warning message is output, the system operator or users can stop running this online file or take other necessary measures.

As a result, the methods for version recording and tracking according to the present invention can integrate file attributes and checksum to control and track version information effectively. Further, the present invention provides a uniform strategy for handling different file types.

Although the present invention has been described in its preferred embodiment, it is not intended to limit the invention to the precise embodiment disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A method for version recording, comprising the steps of:
   storing a file into a data directory;
   calculating the checksum of the file;
   storing the version information, the filename, and the size of the file into the data directory; and
   storing the checksum of the file into the data directory,
   wherein the step for calculating the checksum of the file comprises the steps of:
   dividing the content of the file into a plurality of regions;
   calculating the corresponding contents in these regions with XOR (exclusive or) operation, thus obtaining a sample region;
   summing the sample contents with a predetermined offset in the sample region into several sub-checksum values; and
   combining these sub-checksum values to obtain the checksum of the file.

2. The method as claimed in claim 1 further storing the file attributes into the data directory.

3. The method as claimed in claim 2 wherein the file attributes comprise the setup date of the file.

4. The method as claimed in claim 2 wherein the file attributes comprise the file type.

5. The method as claimed in claim 1 further comprising the steps of:
   monitoring the status of the file;
   calculating the checksum of a new file if the file is updated as the new file;
   storing the filename and the size of the new file into the data directory; and
   storing the checksum of the new file into the data directory.

6. A method for version tracking, comprising the steps of:
   calculating the checksum of a file;
   searching a data directory according to the checksum, the filename, and the size of the file; and
   outputting the version information corresponding to the checksum, the filename, and the size of the file in the data directory,
   wherein the step for calculating the checksum of the file comprises the steps of:
   dividing the content of the file into a plurality of regions;
   calculating the corresponding contents in these regions with XOR (exclusive or) operation, thus obtaining a sample region;
   summing the sample contents with a predetermined offset in the sample region into several sub-checksum values; and
   combining these sub-checksum values to obtain the checksum of the file.

7. The method as claimed in claim 6 further comprising the step of:
   calculating the checksum of an online file;
   searching the data directory according to the checksum, the filename, and the size of the online file; and
   outputting a warning message if the checksum of the online file is different from the checksum recorded in the data directory corresponding to the filename and the size of the online file.

* * * * *